(12) United States Patent
Albadran (10) Patent No.: US 9,602,702 B1
(45) Date of Patent: Mar. 21, 2017

(54) VIDEO CAMERA WITH MULTIPLE DATA INPUT

(71) Applicant: Sulaiman S. Albadran, Dammam (SA)

(72) Inventor: Sulaiman S. Albadran, Dammam (SA)

( * ) Notice: Subject to any disclaimer, the term of this patent is extended or adjusted under 35 U.S.C. 154(b) by 80 days.

(21) Appl. No.: 14/847,523

(22) Filed: Sep. 8, 2015

Related U.S. Application Data (60) Provisional application No. 62/047,277, filed on Sep. 8, 2014.

(51) Int. Cl.
*H04N 5/225* (2006.01)

(52) U.S. Cl.
CPC ......... *H04N 5/2252* (2013.01); *H04N 5/2254* (2013.01)

(58) Field of Classification Search
CPC .......................... H04N 5/2252; H04N 5/2254
USPC .................................................. 348/373–375
See application file for complete search history.

(56) References Cited

U.S. PATENT DOCUMENTS

| | | | |
|---|---|---|---|
| 3,748,992 A | 7/1973 | Anger | |
| 5,548,362 A | 8/1996 | Wah Lo et al. | |
| 6,947,059 B2 * | 9/2005 | Pierce | H04N 5/23238 345/629 |
| 7,463,280 B2 * | 12/2008 | Steuart, III | G03B 35/08 348/36 |
| 8,004,557 B2 | 8/2011 | Pan | |
| 8,004,558 B2 * | 8/2011 | Prechtl | H04N 5/232 348/218.1 |
| 8,289,436 B2 | 10/2012 | Strong | |
| 8,542,288 B2 | 9/2013 | Waqas et al. | |
| 9,152,019 B2 * | 10/2015 | Kintner | G03B 17/561 |
| 9,438,800 B1 * | 9/2016 | Kozko | G06T 11/00 |
| 2002/0094202 A1 | 7/2002 | Chen | |
| 2004/0119822 A1 | 6/2004 | Custer et al. | |
| 2006/0139475 A1 * | 6/2006 | Esch | G03B 37/04 348/340 |
| 2008/0231741 A1 | 9/2008 | McIntyre et al. | |
| 2011/0069148 A1 * | 3/2011 | Jones | H04N 5/232 348/36 |
| 2011/0249100 A1 * | 10/2011 | Jayaram | H04N 5/2253 348/48 |
| 2012/0154521 A1 * | 6/2012 | Townsend | H04N 5/247 348/36 |
| 2012/0242788 A1 * | 9/2012 | Chuang | G08B 13/19602 348/36 |
| 2015/0373279 A1 * | 12/2015 | Osborne | G02B 13/0075 348/36 |

* cited by examiner

*Primary Examiner* — Nhan T Tran
*Assistant Examiner* — Chan Nguyen
(74) *Attorney, Agent, or Firm* — Robert C. Montgomery; Montgomery Patent & Design, LP.

(57) ABSTRACT

A video camera with multiple data inputs includes a camera housing with a plurality of lenses and a single display screen. Each lens is adjustably connected to the camera housing by a flexible lens barrel to allow for multi-axis movement of the lens. A hydraulic system is operatively coupled to each lens barrel to maneuver the lens to a desired position. Each lens has an associated toggle switch to control the hydraulic system and the position of the lens. The display screen includes a plurality of display regions associated with the plurality of lenses to allow a user to view the images taken from each lens simultaneously.

21 Claims, 5 Drawing Sheets

VIDEO CAMERA WITH MULTIPLE DATA INPUT

RELATED APPLICATIONS

The present invention is a continuation of, was first described in, and claims the benefit of U.S. Provisional Application No. 62/047,277, filed Sep. 8, 2014, the entire disclosures of which are incorporated herein by reference.

FIELD OF THE INVENTION

The present invention relates generally to a video camera having multiple data inputs.

BACKGROUND OF THE INVENTION

As any person will attest, security is an area of primary concern, especially in recent times. Due to the fact that people tend to place a high value on their property and personal safety, the marketplace has responded with a variety of products that are intended to protect one's dwelling and belongings from intruders. Ranging in design from simple locking devices to complex motion detectors and forced entry alarm systems, these products comprise a multimillion dollar industry in the United States today. Accordingly, there is a constant need for new and innovative devices that aid in securing one's home or business from burglars, and the like. The use of the video camera with multiple data input provides a means to produce multiple images for the purposes of improving security in a manner which is simple, effective, and cost efficient.

SUMMARY OF THE INVENTION

The inventor has recognized the aforementioned lack in the art and observed that there is a need for a video camera having multiple data inputs.

It is therefore an object of the invention to provide a device comprising a housing having a front surface, a rear surface, a top surface, a bottom surface, a first side surface and a second side surface, thereby forming an enclosure. The device also has a plurality of video head assemblies with each comprising a mounting plate, secured to the front surface, a rod anchor plate, a plurality of neck segments having a proximal neck segment attached to the mounting plate and terminating in a distal neck segment, a plurality of disposition cylinders, each having a first end attached to the mounting plate and a second end attached to the rod anchor plate, a video head secured to the rod anchor plate and a video chip housed in the video head, in mechanical communication with the distal neck segment and capable of capturing an image. The device also has a control module in electrical communication with each video chip and in hydraulic communication with each neck segment and each disposition cylinder with a hydraulic assembly. The rod anchor plate is in mechanical communication with the plurality of disposition cylinders. The control module selectively controls each video head independently and processes each image to a digital image. In some embodiments, the control module is capable of being controlled remotely.

Each video head also comprises a focus lens; a focus lens servo in mechanical communication between the focus lens and the hydraulic assembly, and in electrical communication with the control module, a zoom lens, a zoom lens servo in mechanical communication between the zoom lens and the hydraulic assembly, and in electrical communication with the control module, a video chip retainer in mechanical communication with the distal neck segment housing an individual video chip, the focus lens and the focus lens servo, and a lens carrier projecting outward from the video chip retainer housing the zoom lens and the zoom lens servo.

Each neck segment also comprises an apex and a socket. Each apex comprises a swivel attachment to a socket of an adjacent neck segment and each neck segment also contains an aperture for routing of a wiring harness from the video chip. Each disposition cylinder comprises a cylinder rod having a first cylinder eye at a distal end, a cylinder body having a second cylinder eye at a proximal end, and a proximity sensor secured to the cylinder body distal end and in electrical communication with a microprocessor. The cylinder rod is movably housed with the cylinder body and passes through an aperture in the proximity sensor. In some embodiments the microprocessor is in wireless communication with a remote control.

The mounting plate also comprises a plurality of pairs of clevises where the first end of an individual disposition cylinder is retained within a pair of clevises with a pin which passes through aligned apertures of each clevis and the individual disposition cylinder. The rod anchor plate also comprises a plurality of pairs of clevises where the second end of an individual disposition cylinder is retained within a pair clevises with a pin which passes through aligned apertures of each clevis and the individual disposition cylinder.

The control module also comprises a microprocessor, a power source retained within a compartment, a power switch in electrical communication between the microprocessor and the power source, a plurality of selection switches each in electrical communication with the microprocessor, a display screen located on the rear surface of the housing and in electrical communication with the microprocessor, and a plurality of manual controllers, each corresponding to an individual video head assembly and each in electrical communication with the microprocessor. Each of the plurality of selection switches corresponds to activating an individual video head. Each video chip is in electrical communication with the microprocessor which is in electrical communication with the hydraulic assembly. The microprocessor also selectively displays each digital image on the display screen via the plurality of selection switches and an individual manual controller controls the hydraulic assembly to operably control the corresponding individual video head assembly. The device also has an indicator light located on the housing and in electrical communication between the power switch and the power source.

The hydraulic assembly also comprises a reservoir housed within the housing; a pump housed within the housing and in fluid communication with the reservoir, a valve bank in fluid communication with the pump, a proportional valve in fluid communication between the valve bank and each disposition cylinder and a plurality of servo controllers, each corresponding to a specific video head assembly and in electrical communication between the control module and the proportional valve. The pump is in electrical communication with the control module.

The control module also comprises of an output jack located on the housing and a memory chip slot located on the housing. When multiple images are received from each respective video head simultaneously, the microprocessor converts each given image into a tiled display upon the display screen. The output jack is configured for communication with a standard visual data cable and the memory chip slot is configured to accommodate the insertion of a data card where the data card is in electrical communication with the microprocessor upon insertion.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 camera
15 control module
20 housing
22 front
24 rear
26 side
30 video head
32 mounting plate
34 anchoring fastener
36 cylinder eye clevis
38 cylinder eye pin
40 neck
42a neck segment
42b distal neck segment
44 base
46 socket
47 middle
48 swivel
49 apex
50 disposition cylinder
52 cylinder body
54 cylinder rod
55 proximity sensor
56 cylinder eye
58 cylinder rod eye
62 rod anchor plate
64 rod eye clevis
66 rod eye pin
68 indicia
72 chip retainer
74 video chip
76 focus lens
78 focus lens servo
82 zoom lens
84 lens carrier
86 zoom lens servo
88 wiring harness
92 system power switch
94 system status light
95 illumination
96 video power switch
98 indicator light
102 power source
104 battery compartment
106 electronic circuitry
107 electrical wiring
108 microprocessor
112 joystick controller
114 selection switch
115 display screen
116 output jack
118 memory chip slot
122 hydraulic pump
124 pump motor
126 reservoir
128 valve bank
132 servo control
134 proportional valve
136 hydraulic line
200 conditioning circuitry
205 mixer control
210 multiplexer/sequencer
215 video buffer
220 video display driver

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a video camera (herein referred to as the "device") 10, with multiple data input which provides a means to selectively capture and retain the digital data from one (1) of a plurality of video chips 74 while having provisions to view the images from a plurality of video chips 74 in a patterned tiled array on a display screen 115. The video chips 74 are configured to be mounted on an adjustable neck 40 so as to have the capability to selectively alter the field of view of each video chip 74. The video chips 74 may be of any current technology without limiting the scope of the device 10. It is envisioned that any data supplied to the display screen 115 could be transferred to a separate video monitor capable of receiving such data via a transmission cable connected to an output jack 116 located on some face of the housing 20. Hereafter in this narrative, the various mechanisms utilized for the collection of a set of digital data will be referred to as a video head 30 so as to be more easily discernable from any reference to the entire device 10 as a camera 10.

Figure 1:
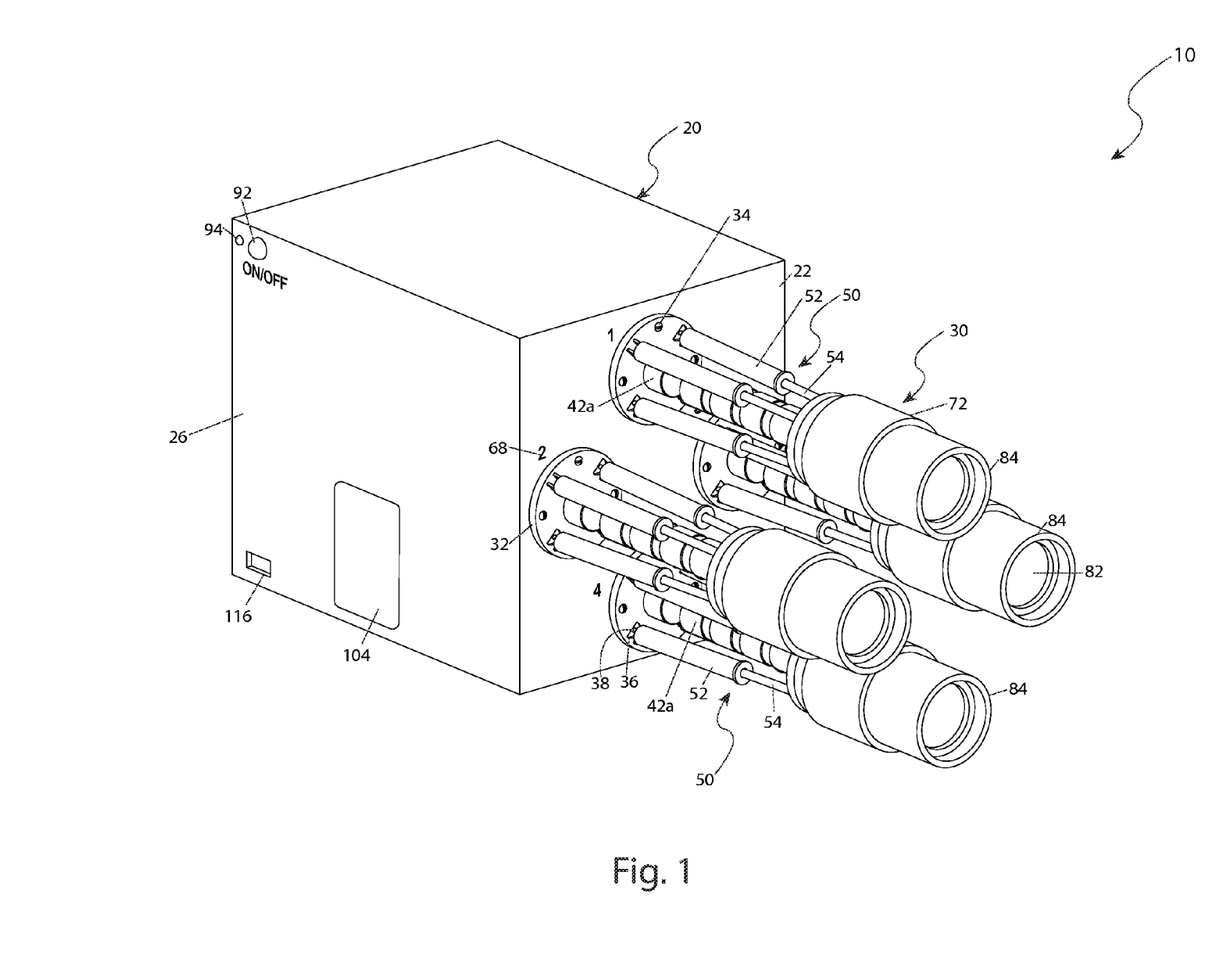
FIG. 1 is an isometric view of a video camera 10 with multiple data input in accordance with the preferred embodiment of the present invention.
Figure 2:
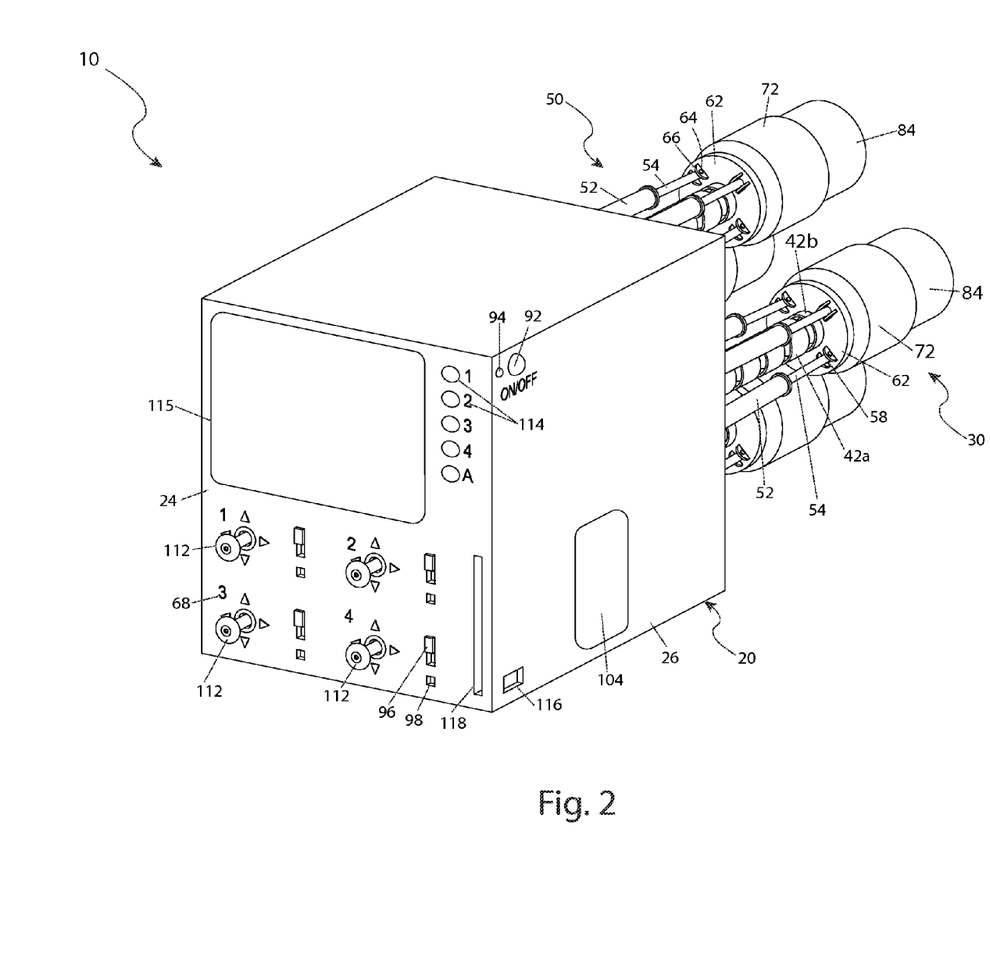
FIG. 2 is an isometric view of the video camera 10 as viewed from the rear 24 in accordance with the preferred embodiment of the present invention.
Figures 3A, 3B:
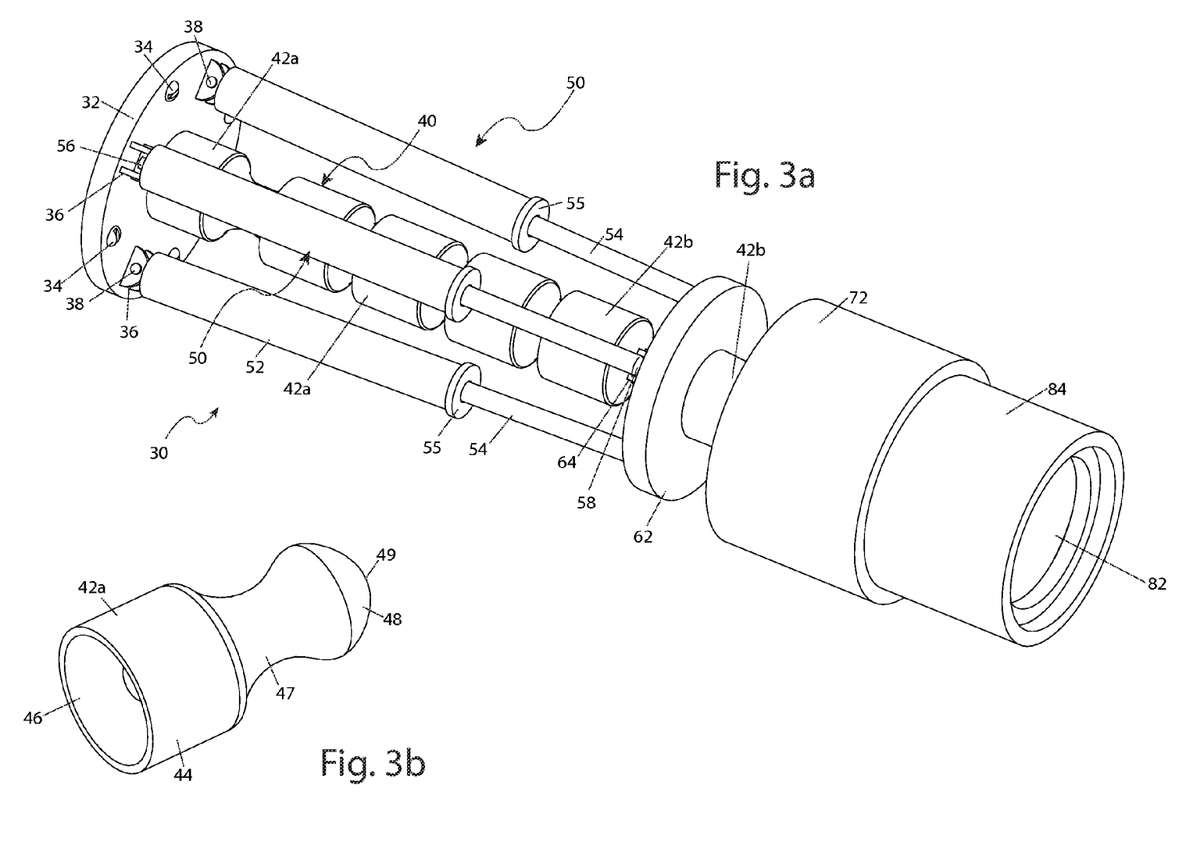
FIG. 3a is an isolated view of a video head 30 of the video camera 10 in accordance with the preferred embodiment of the present invention.
FIG. 3b is an isolated view of a neck segment 42a of the video camera 10 in accordance with the preferred embodiment of the present invention.

Referring now to FIGS. 1 and 2, isometric views of the device 10, according to the preferred embodiment of the present invention, are disclosed. The device 10 includes a housing 20 with a plurality of video heads 30. The housing 20 is preferably composed of a plurality of injection molded thermoplastic parts to form an enclosure to suitably contain the various mechanical, electrical, and electronic components requisite for the proper functioning of the device 10. The housing 20 is provided with a front 22, typically facing away from a user, or a mounting position, and a rear 24 facing toward the user. A plurality of independently controlled video heads 30 is disposed upon the front 22 in a pattern. Each video head 30 is configured as depicted in FIG. 3a to include, at least, a video chip 74 (not shown in this diagram) capable of converting light waves into digital data, a chip retainer 72, a focus lens 76, a zoom lens 82 with a lens carrier 84, and the requisite mechanisms to selectively adjust those lenses 76, 82 on a segmented neck 40 having a plurality of adjustable disposition cylinders 50 attached to a mounting plate 32. The mounting plate 32 is a disk-shaped plate secured to the front 22 of the housing 20 with a plurality of threaded anchoring fasteners 34. A plurality of cylinder eye clevises 36 are disposed around the mounting plate 32 in proximity to the peripheral edge thereof. Each cylinder eye clevis 32 is configured to be a pair of parallel plates between which the cylinder eye 56 is retained by means of a cylinder eye pin 38 inserted into the aligned apertures (not shown) of the cylinder eye 56 and the cylinder eye clevis 36.

A neck segment 42a is attached in a central position to the mounting plate 32. The mounting plate 32 and the neck segments 42a, 42b are preferably composed of a rigid thermoplastic material capable of withstanding the typical loading placed upon the device 10. It is understood that other materials, such as metals, or composite materials, may be utilized without limiting the scope of the device 10. Each neck segment 42a, 42b is configured to have a generally cylindrical shape at a base 44 transitioning in a smooth contour at the middle 47 to a spherical, more bulbous swivel 48 at an apex 49 as depicted in FIG. 3b. The base 44 is provided with a socket 46, formed to be a cylindrical cavity into which the swivel 48 of the preceding neck segment 42a can be inserted. The socket 46 complies with the general shape of the swivel 48 such that a neck segment 42a, 42b may pivotally move relative to a preceding neck segment 42a so as to accomplish a stable tilting arrangement throughout the length of the neck 40 in which the video chip 74, mounted at a distal end of the neck 40 to a distal neck segment 42b, is exposed to a different field of view as compared to a linear relationship in the neck 40. The edge of the socket 46 may be contoured with a radius to provide additional clearance in order to achieve a greater degree of rotation between the neck segments 42a, 42b. An aperture (not shown) may be disposed through the swivel 48 and the middle 47 along the longitudinal axis of the neck segment 42a from the apex 49 to the socket 46 for the routing of a wiring harness 88 through the neck segment 42a. The distal neck segment 42b is configured to have only a cylindrical base 44 with a socket 46 therein for the preceding neck segment 42a and no swivel 48 as the chip retainer 72 is directly attached thereto. The distal neck segment 42b would be provided with an aperture (not shown) similar to the neck segment 42a for the routing of a wiring harness 88 from a chip retainer 72 to a microprocessor 108. A rod anchor plate 62 is attached at a proximal end of the distal neck segment 42b. The rod anchor plate 62 is an annular plate encompassing the distal neck segment 42b to which a plurality of rod eye clevises 64 are attached. Each rod eye clevis 64 is a pair of parallel plates extending from the rod anchor plate 62 between which a cylinder rod eye 58 is retained by means of a rod eye pin 66 inserted through aligned apertures (not shown). The disposition cylinders 50 are attached at a piston side to the cylinder eye clevis 36 and to the rod eye clevis 64 at a rod end. It is envisioned that the disposition cylinders 50 are provided with a proximity sensor 55, or similar location feedback devices, so that the exact position of the flexible neck 40 can be controlled to respond to the positioning input from a user.

The chip retainer 72 is preferably configured to be a closed-end hollow cylinder into which a video chip 74, a focusing lens 76, and the focus lens servo 78 are disposed. Projecting from the chip retainer 72 is a lens carrier 84 in which a portion of an adjustable zoom lens 82 is disposed. The zoom lens 82 is provided for the magnification of a photographic image prior to that image striking the video chip 74 for analysis and conversion to digital data. The zoom lens 82 is adjustably controlled by a zoom lens servo 86 manipulated by a user in a procedure to be detailed later in this narrative. The focus lens 76 is controlled by a standard auto-focus device common to digital photography.

It is envisioned that certain indicia 68 may be disposed on the front 22 of the housing 20 to identify each specific video head 30 of the device 10 in relation to any control devices for those video heads 30 which may be located at other points of the housing 20.

Disposed on the rear 24 of the housing 20 is a display screen 115. The display screen 115 is preferably configured to be an LCD matrix having the capability of displaying the recreated images captured by one (1) or more of the video heads 30. In proximity to the display screen 115 is a plurality of selection switches 114 capable of activating an image on the display screen 115. The selection switches 114 correspond with each of the video heads 30 on the front 22 of the housing 20 plus an additional selection switch 114 capable of activating the necessary electronic circuitry 106 to project an array of images comprised of each of the images from each of the respective video heads 30.

Also disposed on the rear 24 of the housing 20 is a plurality of groupings of manual controls for each of the respective video heads 30. Each grouping includes an video power switch 96 to connect electrical power to the video head 30, an indicator light 98 which provides visual confirmation of the supply of power, and a joystick controller 112. The joystick controller 112 provides servo control and feedback circuitry for the positioning of the various video heads 30 as well as control of the zoom lens servo 86 on those video heads 30. The video power switch 96 is preferably a two-position slide switch. It is understood that any other type of switch may be utilized without limiting the scope of the device 10. The indicator light 98 is preferably an LED emitting illumination 95 in a green wavelength. The system 10 may be configured to operate equally well without indicator lights 98 and as such should not be seen as a limiting factor in the scope of the device 10. The joystick controller 112 is envisioned to permit the manipulation of the extension and retraction of the disposition cylinders 50 in a manner which would result in the positioning of the chip retainer 72 and the video chip 74, the focus lens 76, and the zoom lens 82 therein in several axes so as to provide an alternate field of view. The joystick controller 112 would also be provided with additional control over the zoom lens 82 of the video head 30. It is envisioned that the depression of the joystick controller 112 for a particular video head 30 would activate a certain portion of the electronic circuitry 106, via the wiring harness 88, to energize the zoom lens servo 86 of that video head 30 to accomplish the maximum zoom adjustment (the greatest magnification of an image) in a smooth continuous operation lasting several seconds. A continued depression of the joystick controller 112 would cause the zoom lens servo 86 to be reversed so as to zoom out again.

It is further envisioned that illustrative indicia 68 may be disposed on the rear 24 of the housing 20 to graphically identify certain controls so as to simplify the operation thereof.

Figure 4:
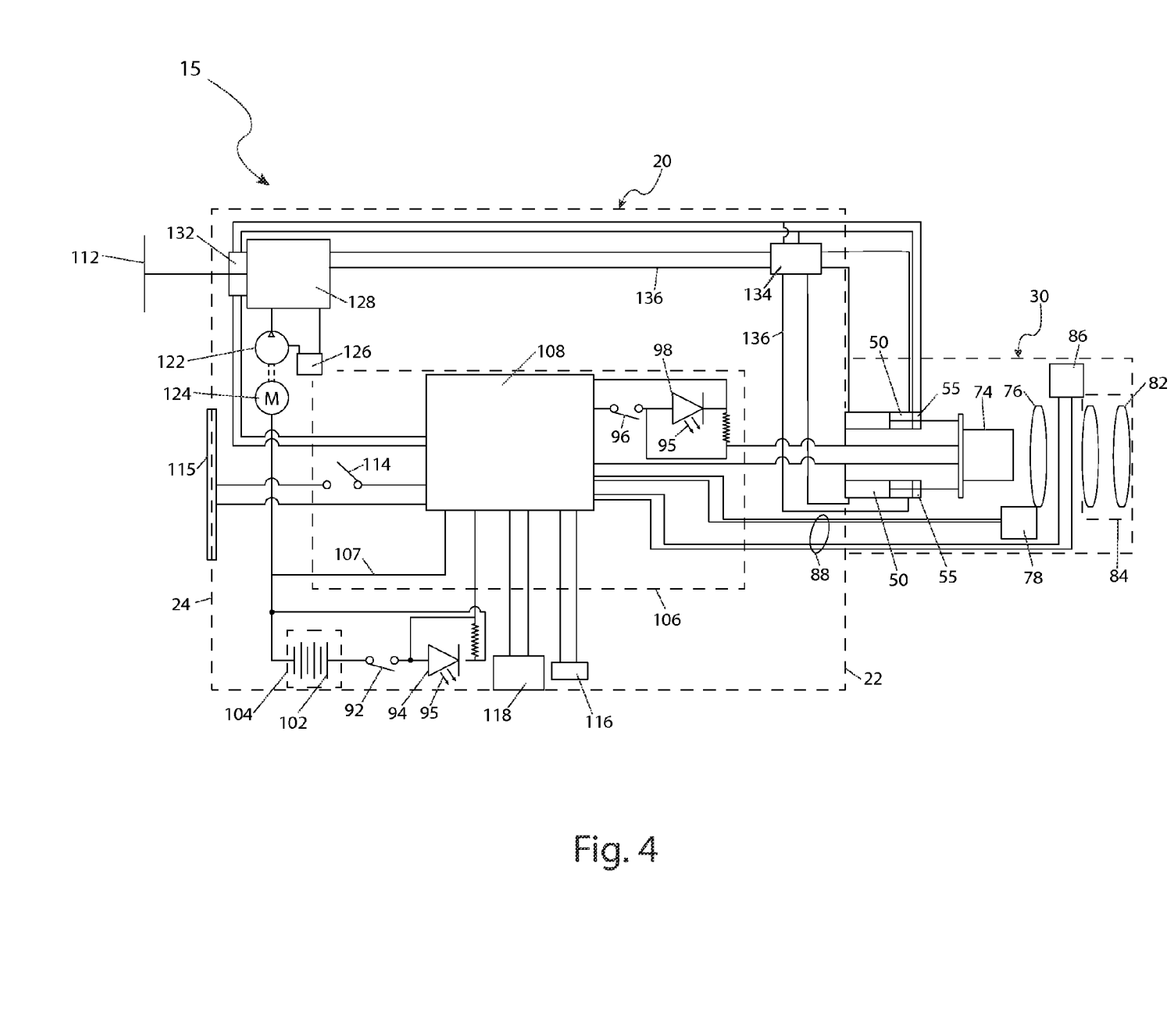
FIG. 4 is an operational block diagram of the control module 15 in accordance with the preferred embodiment of the present invention; and, FIG. 5 is a block diagram of the video processing circuitry contained with the operating code of the microprocessor 108 of the camera 10 in accordance with the preferred embodiment of the present invention

At some location on an exterior surface of the housing 20, preferably on a face between the front 22 and the rear 24, is a system power switch 92 and a system status light 94. The system power switch 92 is preferably a push-button switch capable of placing the power source 102, as shown in FIG. 4, in electrical communication with the electronic circuitry 106 and a microprocessor 108 of the device 10. It is understood that other types of switches may be utilized without limiting the scope of the device 10. The system status light 94 is preferably an LED emitting illumination 95 in a green wavelength to indicate that the device 10 is energized. The microprocessor 108 is an integrated circuit capable of controlling the various functions of the device 10 including driving a hydraulic pump 122 at an appropriate time and assisting in the control of the functioning of the disposition cylinders 50 of each video head 30.

In some embodiments, an output jack 116 capable of receiving a conventional data transmission cable is disposed upon the exterior of the housing 20, preferably a side 26, for the purpose of selectively routing data from the microprocessor 116 of the device 10 to some alternate monitor in a secondary location. It is envisioned that a memory chip slot 118 may also be provided at some exterior location on the housing 20, as illustrated in FIG. 2, to receive any conventional memory card upon which data from any video head 50, via the microprocessor 116, may be placed for future purposes.

It is envisioned that in other embodiments the housing 20 may be provided with a threaded aperture (not shown) on a bottom face to accommodate a standard fastener for the connection to a tripod or other fixed base mounting provision.

Referring now to FIG. 4, an operational block diagram of the control module 15, according to the preferred embodiment of the present invention, is disclosed. The operational diagram illustrates the device 10 with one (1) operable video head 30 and the controls for the proper functioning thereof for the sake of simplicity and not as a limiting factor. However, it can be seen that a mere duplication of certain portions can result in a completed diagram for the entire device 10. The device 10 includes an internal power source 102 retained within a battery compartment 104, and the microprocessor 108. The battery compartment 104 is capable of being selectively opened by a user for the installation, or servicing of, a power source 102. The power source 102 may be a battery of any current technology, or another device, such as a capacitor, capable of holding an electrical charge and supplying that charge as an electromotive force to the electronic circuitry 106 in order to accomplish the proper function thereof. Electrical wiring 107 is provided for power conduction between the power source 102 and the microprocessor 108, and between the microprocessor 108 and all other electrical parts of the device 10.

The microprocessor 108 contains the logic and control circuitry to execute the various functions of the device at the control of a user. The microprocessor 108 along with the various switches 92, 96, 114, and the interconnecting electrical wiring 107 is considered to be the electronic circuitry 106. The power source 102 is in electrical communication with the microprocessor 108 via the system power switch 92. The microprocessor 108 is in electrical communication with the selected video head 30 via the respective video power switch 96. The image striking the video chip 74 through the zoom lens 82 and the focus lens 76 is digitized and communicated to the microprocessor 108. The image, digitized in the microprocessor 108 can be sent to the display screen 115 via the selection switch 114. In use, if data from more than one (1) video head 30 is directed to the display screen simultaneously, the microprocessor 108 will contain programming to switch the display screen 115 to a tiled array format capable of exhibiting the reconstructed image from each video chip 74 in a separate tile. An output jack 116 is provided for the attachment of a standard data cable so that the data can be sent to, and displayed upon, a separate monitor capable of receiving such data. A memory chip slot 118 is also provided on the housing 20 for the insertion of a standard data card onto which the data may be optionally recorded with the inclusion of the appropriate controls.

The microprocessor 108 also controls the pump motor 124 as well as the servo controls 132 and the proportional valve 134 for hydraulic control of the disposition cylinders 50 of each video head 30. Upon the manipulation of the joystick controller 112 for each video head 30, the microprocessor signals the pump motor 124 to rotate thereby activating the hydraulic pump 122 to circulate some non-compressible fluid from the reservoir 126 to the valve bank 128. The fluid will circulate through the valve bank 128 as directed by the servo control 132 in communication with the microprocessor 108 and travel to the proportional valve 134 and ultimately to the appropriate disposition cylinder(s) 50 via the hydraulic lines 136. The pump motor 124 consists of any of a variety of commercially available, copper wound, low voltage, small frame, direct current motors capable of generating sufficient torque to induce the desired motion in the hydraulic pump 122. The hydraulic pump 122 is any of a variety of commercially available, positive displacement pumps capable of delivering the necessary quantity of a non-compressible fluid at the requisite pressure level to affect the desired movement of the disposition cylinders 50.

In an alternate embodiment the device 10 may be configured such that the microprocessor 108 may be remotely influenced, via the output jack 116 for example, to permit a remote user to adjust the video heads 30 so as to monitor a location from various approach angles.

Figure 5:
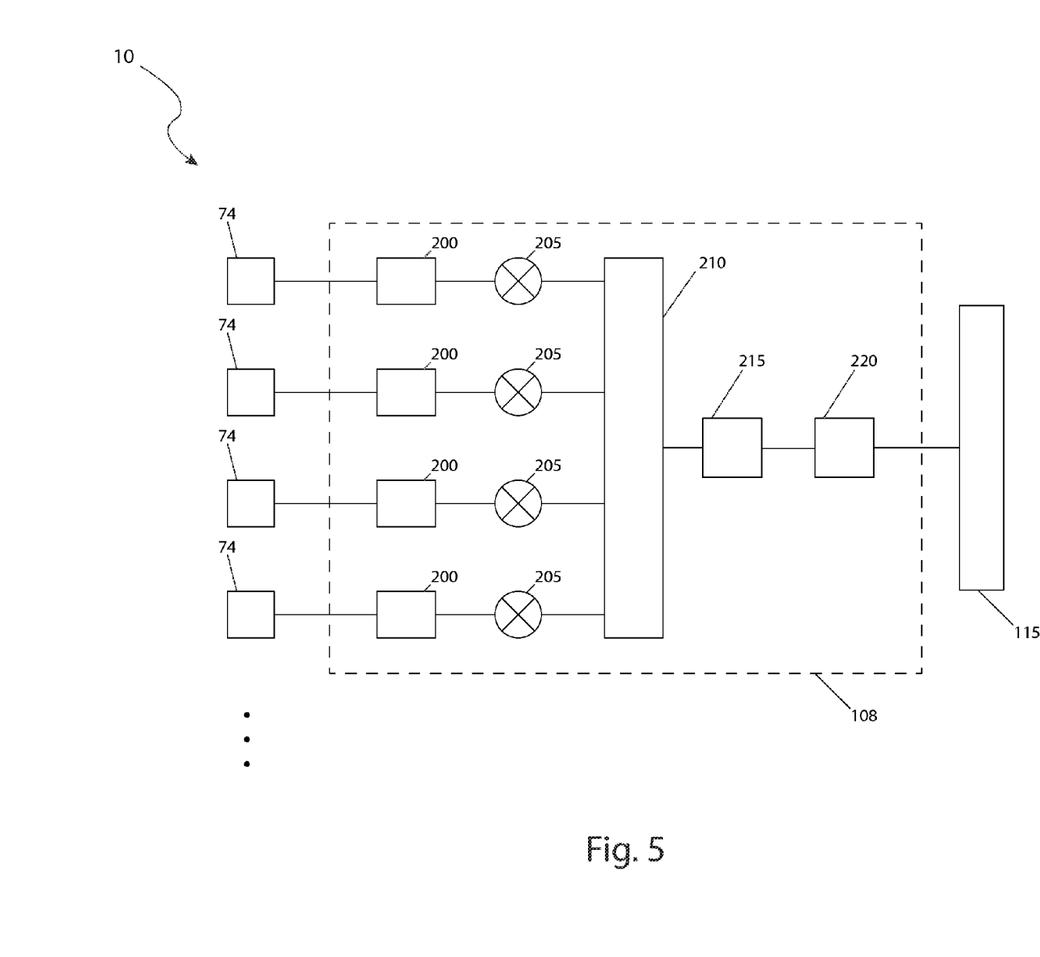

Referring finally to FIG. 5, a block diagram of the video processing circuitry contained with the operating code of the microprocessor 108 of the camera 10 in accordance with the preferred embodiment of the present invention is disclosed. The plurality of video chips 74 serve as the primary electrical input to the microprocessor 108. As aforementioned described, a total of four (4) are shown for illustrative purposes, however it can be seen that fewer or additional video chips 74 can be utilized in the teachings of the present invention, and as such, a quantity of four (4) should not be interpreted as a limiting factor of the present invention. The electrical signals from the video chips 74 are provided to a conditioning circuitry 200 that provides compensation for variances such as luminance, external interference, timing issues, and the like. The output of the conditioning circuitry 200 is then routed to a mixer control 205 to allow for control of timing issues, video synchronization, stabilization, and the like. The resultant signal is then passed to a multiplexer/sequencer 210 which allows for either sequential display of the selected video chip 74 signal upon the display screen 115 based upon selection of the respective video power switch 96 (as shown in FIG. 4) or all signals from all video chips 74 in an array configuration. It is envisioned that individual display resolutions and thus overall display size can be governed here as well. The output signal from the multiplexer/sequencer 210 is passed to a video buffer 215 to allow for stabilization of the signal for additional transmission. Before the signal is passed to the display screen 115, it is passed through a video display driver 220 to account for control and interface functionality between the display screen 115 and various output parameters as generated by the multiplexer/sequencer 210.

In accordance with the invention, the illustrated embodiment can be utilized by an enabled individual in a simple and straightforward manner with little or no training. After initial purchase or acquisition of the device 10, it would be approximately arranged as indicated in FIGS. 1 and 2. The method of installing and utilizing the device 10 may be achieved by performing a series of steps. It can be appreciated that the operational steps may be performed in alternative order and as such any operational description of use should not be viewed as a limiting factor. Typically, the device 10 may be utilized in the following steps: acquiring a model of the device 10 having a desired style to suit the taste of a user; opening the battery compartment 104; installing an appropriate power source 103; closing the battery compartment 104; manipulating the system power switch 92 so as to energize the device 10; selecting which of the video heads 30 will be utilized; manipulating the video power switch 96 of each selected video head 30 to energized that (those) particular video head(s) 30; selecting which video head 30 input to monitor on the display screen 115; manipulating the selection switch 114 to bring about the exhibition of that image upon the display screen 115; manipulating the joystick controller 112 to set the desired configuration of the adjustable neck 40; and viewing the resulting images. It is envisioned that all, or a portion of, the captured data may be recorded on a standard memory card inserted into the memory chip slot 118, or on some other media remotely via the output jack 116.

What is claimed is:

1. A device, comprising:
    a housing having a front surface, a rear surface, a top surface, a bottom surface, a first side surface and a second side surface, thereby forming an enclosure;
    a plurality of video head assemblies, each comprising:
        a mounting plate, secured to said front surface
        a rod anchor plate;
        a plurality of neck segments, having a proximal neck segment attached to said mounting plate and terminating in a distal neck segment;
        a plurality of disposition cylinders, each having a first end attached to said mounting plate and a second end attached to said rod anchor plate;
        a video head secured to said rod anchor plate; and,
        a video chip housed in said video head, in mechanical communication with said distal neck segment, and capable of capturing an image; and,
    a control module in electrical communication with each video chip and in hydraulic communication with each neck segment and each disposition cylinder with a hydraulic assembly;
    wherein said rod anchor plate is in mechanical communication with said plurality of disposition cylinders;
    wherein said control module selectively controls each video head independently; and,
    wherein said control module processes each image to a digital image.

2. The device of claim 1, wherein each video head further comprises:
    a focus lens;
    a focus lens servo in mechanical communication between said focus lens and said hydraulic assembly, and in electrical communication with said control module;
    a zoom lens;
    a zoom lens servo in mechanical communication between said zoom lens and said hydraulic assembly, and in electrical communication with said control module;
    a video chip retainer in mechanical communication with said distal neck segment housing an individual video chip, said focus lens and said focus lens servo; and,
    a lens carrier, projecting outward from said video chip retainer housing said zoom lens and said zoom lens servo.

3. The device of claim 1, wherein each neck segment further comprises:
    an apex; and,
    a socket;
    wherein each apex comprises a swivel attachment to a socket of an adjacent neck segment; and,
    wherein each said neck segment contains an aperture for routing of a wiring harness from said video chip.

4. The device of claim 1, wherein each disposition cylinder comprises:
    a cylinder rod having a first cylinder eye at a distal end;
    a cylinder body having a second cylinder eye at a proximal end; and,
    a proximity sensor secured to said cylinder body distal end and in electrical communication with a microprocessor;
    wherein said cylinder rod is movably housed with said cylinder body; and,
    wherein said cylinder rod passes through an aperture in said proximity sensor.

5. The device of claim 1, wherein said mounting plate further comprises a plurality of pairs of clevises;
    wherein said first end of an individual disposition cylinder is retained within a pair of clevises with a pin passing through aligned apertures of each clevis and said individual disposition cylinder.

6. The device of claim 1, wherein said rod anchor plate further comprises a plurality of pairs of clevises;
    wherein said second end of an individual disposition cylinder is retained within a pair clevises with a pin passing through aligned apertures of each clevis and said individual disposition cylinder.

7. The device of claim 1, wherein said control module further comprises:
    a microprocessor;
    a power source retained within a compartment;
    a power switch in electrical communication between said microprocessor and said power source;
    a plurality of selection switches each in electrical communication with said microprocessor;
    a display screen located on said rear surface of said housing and in electrical communication with said microprocessor; and, a plurality of manual controllers, each corresponding to an individual video head assembly and each in electrical communication with said microprocessor;

wherein each of said plurality of selection switches corresponds to activating an individual video head;

wherein each video chip is in electrical communication with said microprocessor;

wherein said microprocessor is in electrical communication with said hydraulic assembly;

wherein said microprocessor selectively displays each digital image on said display screen via said plurality of selection switches; and, wherein an individual manual controller controls said hydraulic assembly to operably control said corresponding individual video head assembly.

8. The device of claim 7, further comprising an indicator light located on said housing and in electrical communication between said power switch and said power source.

9. The device of claim 7, wherein said hydraulic assembly further comprises:
a reservoir housed within said housing;
a pump housed within said housing and in fluid communication with said reservoir;
a valve bank in fluid communication with said pump;
a proportional valve in fluid communication between said valve bank and each disposition cylinder; and,
a plurality of servo controllers, each corresponding to a specific video head assembly and in electrical communication between said control module and said proportional valve;
wherein said pump is in electrical communication with said control module.

10. The device of claim 7 wherein said control module further comprises:
an output jack located on said housing; and,
a memory chip slot located on said housing;
wherein when multiple images are received from each respective video head simultaneously, said microprocessor converts each given image into a tiled display upon said display screen;
wherein said output jack is configured for communication with a standard visual data cable; and,
wherein said memory chip slot is configured to accommodate the insertion of a data card wherein said data card is in electrical communication with said microprocessor upon insertion.

11. A device, comprising:
a housing having a front surface, a rear surface, a top surface, a bottom surface, a first side surface and a second side surface, thereby forming an enclosure;
a plurality of video head assemblies, each comprising:
a mounting plate, secured to said front surface;
a rod anchor plate;
a plurality of neck segments, having a proximal neck segment attached to said mounting plate and terminating in a distal neck segment;
a plurality of disposition cylinders, each having a first end attached to said mounting plate and a second end attached to said rod anchor plate;
a video head secured to said rod anchor plate; and,
a video chip housed in said video head, in mechanical communication with said distal neck segment, and capable of capturing an image; and,
a control module in electrical communication with each video chip and in hydraulic communication with each neck segment and each disposition cylinder with a hydraulic assembly;

wherein said rod anchor plate is in mechanical communication with said plurality of disposition cylinders;

wherein said control module is capable of being controlled remotely;

wherein said control module selectively controls each video head independently; and, wherein said control module processes each image to a digital image.

12. The device of claim 11, wherein each video head further comprises:
a focus lens;
a focus lens servo in mechanical communication between said focus lens and said hydraulic assembly, and in electrical communication with said control module;
a zoom lens;
a zoom lens servo in mechanical communication between said zoom lens and said hydraulic assembly, and in electrical communication with said control module;
a video chip retainer in mechanical communication with said distal neck segment housing an individual video chip, said focus lens and said focus lens servo; and,
a lens carrier, projecting outward from said video chip retainer having said zoom lens and said zoom lens servo.

13. The device of claim 11, wherein each neck segment further comprises:
an apex; and,
a socket;
wherein each apex comprises a swivel attachment to a socket of an adjacent neck segment; and,
wherein each said neck segment contains an aperture for routing of a wiring harness from said video chip.

14. The device of claim 11, wherein each disposition cylinder comprises:
a cylinder rod having a first cylinder eye at a distal end;
a cylinder body having a second cylinder eye at a proximal end; and,
a proximity sensor secured to said cylinder body distal end and in electrical communication with a microprocessor;
wherein said cylinder rod is movably housed with said cylinder body; and,
wherein said cylinder rod passes through an aperture in said proximity sensor.

15. The device of claim 11, wherein said mounting plate further comprises a plurality of pairs of clevises;
wherein said first end of an individual disposition cylinder is retained within a pair of clevises with a pin passing through aligned apertures of each clevis and said individual disposition cylinder.

16. The device of claim 11, wherein said rod anchor plate further comprises a plurality of pairs of clevises;
wherein said second end of an individual disposition cylinder is retained within a pair clevises with a pin passing through aligned apertures of each clevis and said individual disposition cylinder.

17. The device of claim 11, wherein said control module further comprises
a microprocessor;
a power source retained within a compartment;
a power switch in electrical communication between said microprocessor and said power source;
a plurality of selection switches each in electrical communication with said microprocessor;
a display screen located on said rear surface of said housing and in electrical communication with said microprocessor; and, a plurality of manual controllers, each corresponding to an individual video head assembly and each in electrical communication with said microprocessor;

wherein each of said plurality of selection switches corresponds to activating an individual video head;

wherein each video chip is in electrical communication with said microprocessor;

wherein said microprocessor is in electrical communication with said hydraulic assembly;

wherein said microprocessor selectively displays each digital image on said display screen via said plurality of selection switches; and, wherein an individual manual controller controls said hydraulic assembly to operably control said corresponding individual video head assembly.

18. The device of claim 17, further comprising an indicator light located on said housing and in electrical communication between said power switch and said power source.

19. The device of claim 17, wherein said hydraulic assembly further comprises:

a reservoir housed within said housing;

a pump housed within said housing and in fluid communication with said reservoir;

a valve bank in fluid communication with said pump;

a proportional valve in fluid communication between said valve bank and each disposition cylinder; and, a plurality of servo controllers, each corresponding to a specific video head assembly and in electrical communication between said control module and said proportional valve;

wherein said pump is in electrical communication with said control module.

20. The device of claim 17 wherein said control module further comprises:

an output jack located on said housing; and, a memory chip slot located on said housing;

wherein when multiple images are received from each respective video head simultaneously said microprocessor converts each given image into a tiled display upon said display screen;

wherein said output jack is configured for communication with a standard visual data cable; and, wherein said memory chip slot is configured to accommodate the insertion of a data card wherein said data card is in electrical communication with said microprocessor upon insertion.

21. The device of claim 17, wherein said microprocessor is in wireless communication with a remote control.

* * * * *